ns of this
patent is extended or adjusted under 35
U.S.C. 154(b) by 246 days.

(12) United States Patent (10) Patent No.: US 8,935,092 B2
Kim et al. (45) Date of Patent: Jan. 13, 2015

(54) NAVIGATION SYSTEM, SERVER CONNECTED THERETO, AND METHOD FOR CONTROLLING VEHICLE NAVIGATION

(75) Inventors: Heungwon Kim, Seoul (KR); Seungwan Woo, Seoul (KR); Wonkeun Lee, Gwangmyung-si (KR); Haeil Lee, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 246 days.

(21) Appl. No.: 13/519,415

(22) PCT Filed: Jan. 14, 2011

(86) PCT No.: PCT/KR2011/000298
§ 371 (c)(1),
(2), (4) Date: Aug. 20, 2012

(87) PCT Pub. No.: WO2011/090296
PCT Pub. Date: Jul. 28, 2011

(65) Prior Publication Data
US 2012/0303269 A1 Nov. 29, 2012

(51) Int. Cl.
*G01C 21/00* (2006.01)
*G09G 5/10* (2006.01)
*G08G 1/0969* (2006.01)
*G01C 21/36* (2006.01)

(52) U.S. Cl.
CPC .......... *G08G 1/0969* (2013.01); *G01C 21/3647* (2013.01)
USPC ......................................... 701/430; 345/619

(58) Field of Classification Search
CPC .................. G08B 13/19647; G08B 13/19673; G08B 13/19669; G08B 13/19695; G08B 13/19632; G08B 13/19641; G08B 13/19671; G08B 13/19667; G08B 13/19656; G08B 15/001; B60R 11/02; B60R 11/0211; B60R 11/04; B60R 11/0235; B60R 2011/0085; B60R 2001/1253; B60R 2011/0288; B60R 2011/0005; B60R 11/0247; B60R 25/302; B60R 25/305; B60R 25/33; B60R 1/00; B60R 2025/1013
USPC .......... 701/9, 36, 45, 301, 302; 340/436, 438, 340/988–996
See application file for complete search history.

(56) References Cited

U.S. PATENT DOCUMENTS

2005/0101248 A1* 5/2005 Vollath .......................... 455/12.1
2009/0234847 A1* 9/2009 Homma et al. .................... 707/5

FOREIGN PATENT DOCUMENTS

JP          2003-067875      *  3/2003
KR       1020060036259         4/2006
(Continued)

*Primary Examiner* — Muhammad Shafi
(74) *Attorney, Agent, or Firm* — Fox Rothschild, LLP

(57) ABSTRACT

A navigation system, a server connected thereto, and a method for controlling a vehicle navigation system are provided. The vehicle navigation system includes a display; an input unit configured to receive input information corresponding to a reference position; a storage configured to store video data mapped with first location data, and map data; a communication unit configured to receive the video data from a vehicle black box installed in a vehicle; and a controller configured to obtain second location data from the map data using the input information, to search the storage for video data mapped with the first location data corresponding to a location within a predetermined distance from a location corresponding to the second location data and to output the search result to the display. According to the present invention, it is possible to search video data or video frames even when the user does not input information on a correct location by searching video data mapped with first location data corresponding to a location within a predetermined distance from a location corresponding to second location data obtained using information input by the user.

19 Claims, 15 Drawing Sheets

(56) References Cited

FOREIGN PATENT DOCUMENTS

| KR | 2005-0069766 | * | 2/2007 |
| KR | 1020080044065 | | 5/2008 |
| KR | 2007-0086829 | * | 3/2009 |
| KR | 1020090021922 | | 3/2009 |

* cited by examiner ined distance from a location corresponding to the second location data; and outputting the search result.

According to another aspect of the present invention, a computer readable medium stores a program for executing one of the methods.

Advantageous Effects

The navigation system, the sever connected thereto and the method for controlling vehicle navigation according to the present invention can search video data or a video frame even when a user does not input information on a correct location by searching video data mapped with first location data corresponding to a location within a predetermined distance from a location corresponding to second location data obtained using input information.

Furthermore, it is possible to provide route information, information on accident black spots, etc., which are obtained using video data mapped with the first location data, to the user such that the user can use a variety of new services.

NAVIGATION SYSTEM, SERVER CONNECTED THERETO, AND METHOD FOR CONTROLLING VEHICLE NAVIGATION

CROSS REFERENCE TO RELATED APPLICATIONS

This application is the national phase application of international application no. PCT/KR2011/000298, filed Jan. 14, 2011, which claims priority to Korean application no. 10-2010-0006161, filed Jan. 22, 2010. The contents of the aforementioned applications are incorporated herein in their entirety.

TECHNICAL FIELD

The present invention relates to a navigation system and, more particularly, to a vehicle navigation system and a vehicle black box.

BACKGROUND ART

With the popularization of the Internet and modification of location information related laws, location based service (LBS) related industries are activated. As one of location based services, a vehicle navigation service which measures a current location of a vehicle or guides a route to a destination is also rapidly activated.

To judge the negligence in an accident occurring when a vehicle stops or runs, objective data is needed in many cases. Accordingly, a vehicle black box capable of providing the objective data is used. However, a conventional vehicle black box provides only simple and superficial information about a vehicle state and cannot effectively meet the demands of users.

DETAILED DESCRIPTION OF THE INVENTION

Technical Problems

An object of the present invention is to provide a navigation system configured to search video data mapped with location information, a sever connected to the navigation system, and a method for controlling vehicle navigation.

Technical Solutions

According to an aspect of the present invention, a vehicle navigation system includes a display; an input unit configured to receive input information corresponding to a reference position; a storage configured to store video data mapped with first location data, and map data; a communication unit configured to receive the video data from a vehicle black box installed in a vehicle; and a controller configured to obtain second location data from the map data using the input information, to search the storage for video data mapped with the first location data corresponding to a location within a predetermined distance from a location corresponding to the second location data and to output the search result to the display.

According to another aspect of the present invention, a method for controlling a vehicle navigation system includes receiving video data mapped with first location data from a vehicle black box installed in a vehicle; storing the video data; receiving input information corresponding to a reference position; obtaining second location data from map data using the input information; searching video data mapped with the first location data corresponding to a location within a prede-

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
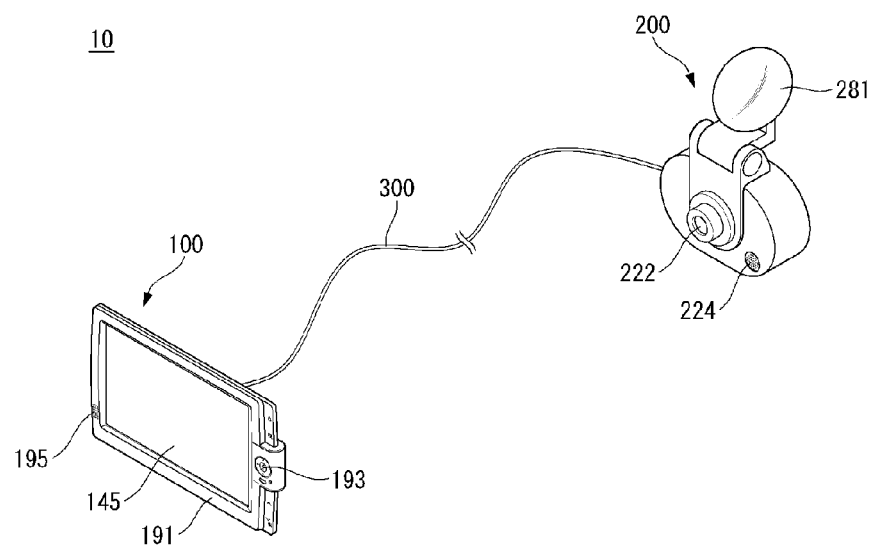
FIG. 1 illustrates a navigation system according to an embodiment of the present invention.

FIG. 1 illustrates a navigation system according to an embodiment of the present invention.

Referring to FIG. 1, the navigation system 10 according to an embodiment of the present invention may include a vehicle navigation system 100 and a vehicle black box 200.

The navigation system 10 may be a system that informs a driver or a passenger of a vehicle of information about driving and maintenance of the vehicle. The navigation system 10 may be the vehicle navigation system 100 in a narrow sense and may be a system including various electronic devices connected with the vehicle navigation system 100 by wire or wirelessly in a broad sense. That is, electronic devices capable of complementing and augmenting the function of the vehicle navigation system 100 can be connected with the vehicle navigation system 100 to implement the integrated navigation system 10. The electronic devices capable of implementing the navigation system 10 by being connected with the vehicle navigation system 100 may include a mobile terminal that can be linked to a mobile communication network, a remote controller, etc. Furthermore, the electronic devices may include the vehicle black box 200. The vehicle black box 200 may be integrated with or separated from the vehicle navigation system 100. While FIG. 1 shows that the vehicle black box 200 is provided separately from the vehicle navigation system 100 and connected with the vehicle navigation system 100 through a communication cable 300, the vehicle black box 200 can be integrated with the vehicle navigation system 100.

The vehicle navigation system 100 may include a display 145 attached to the front of a navigation housing 191, a navigation operation key 193, and a navigation microphone 195.

The navigation housing 191 forms the external appearance of the vehicle navigation system 100. The vehicle navigation system 100 may be exposed to various external environments such as high or low temperature for seasonal reason, direct/indirect external shocks, etc. The navigation housing 191 may protect internal electronic components of the vehicle navigation system 100 from external environment variations and make the external appearance of the vehicle navigation system 100 beautiful. To achieve this, the navigation housing 191 may be formed by injection molding using a material such as ABS, PC or reinforced engineering plastics.

The display 145 visually displays various types of information. Information displayed on the display 145 may include map data combined with route information, images of broadcast programs including DMB broadcast programs, and images stored in a memory. The display 145 may be divided into several regions physically or logically. Physically divided displays mean two or more displays connected to each other. Logically divided displays mean a display of a plurality of independent screens on one display 145. For example, route information is displayed on part of the display 145 while a received DMB broadcast program is displayed on the display 145, or a map and the DMB broadcast program are respectively displayed on different regions of the display 145. With the tendency of convergence of various functions into the vehicle navigation system 100, the display 145 is increasingly logically divided to display various types of information. Furthermore, to display a large amount of information, the screen of the display 145 becomes larger.

All or some of the surface of the display 145 may be a touchscreen capable of receiving a touch input from a user. For example, the touchscreen function can be activated by touching a function selection button displayed on the display 145. That is, the display 145 can function as both an output unit 140 shown in FIG. 3 and an input unit 120 shown in FIG. 3.

The navigation operation key 193 may be provided to execute various functions of the vehicle navigation system 100 or to allow a user to directly input necessary data. Frequently used specific functions may be mapped to the navigation operation key 193 to improve user convenience.

The navigation microphone 195 may be provided to receive sounds including voices. For example, a specific function of the navigation device 100 can be executed on the basis of a voice signal received through the navigation microphone 195. Furthermore, it is possible to detect a current state of the vehicle, such as an accident, on the basis of a sound signal received through the navigation microphone 195.

The vehicle block box 200 may store information necessary for a procedure of dealing with an accident by exchanging signals with the vehicle navigation system 100. For example, When an accident occurs while the vehicle runs, it is possible to analyze an image acquired by the vehicle black box 200 and use the image to determine the details of the accident and a degree of the accident. Furthermore, the vehicle black box 200 connected to the vehicle navigation system 100 can use information stored in the vehicle navigation system 100. For example, it is possible to map images obtained from the vehicle black box 200 with map data stored in the vehicle navigation system 100 to improve the utility of the vehicle black box 200.

The vehicle black box 200 can obtain information on the vehicle when the vehicle runs or stops. That is, the vehicle black box 200 can capture an image not only when the vehicle runs but also when the vehicle stops. The quality of an image obtained through the vehicle black box 200 may be fixed or variable. For example, the picture quality can be increased in the event of an accident and decreased in a normal case so as to store a salient image while minimizing a necessary storage space.

The vehicle black box 200 may include a black box camera 222, a black box microphone 224, and an attachment part 281.

The black box camera 222 can take pictures of the inside and outside of the vehicle. The vehicle black box 200 may include one or more black box cameras 222. When the vehicle black box 200 include a plurality of black box cameras 222, one of the black box cameras 222 may be integrated with the vehicle black box 200 and others may be attached to portions of the vehicle to capture images and transmit the captured images to the vehicle black box 200. When the vehicle block box 200 includes one black box camera 222, the black box camera 222 may be installed such that it can photograph a forward view of the vehicle. Images captured by the black box camera 222 may be stored in the vehicle black box 200 or the vehicle navigation system 100.

The black box microphone 224 may acquire a sound generated from the inside or outside of the vehicle. The black box microphone 224 may execute functions similar to those of the above-mentioned navigation microphone 195.

The attachment part 281 may fix the vehicle black box 200 to the vehicle. The attachment part 281 may be a suction plate capable of attaching the vehicle black box 200 to the windshield of the vehicle or a fixing device capable of combining the vehicle black box 200 with the room mirror of the vehicle.

Figure 2:
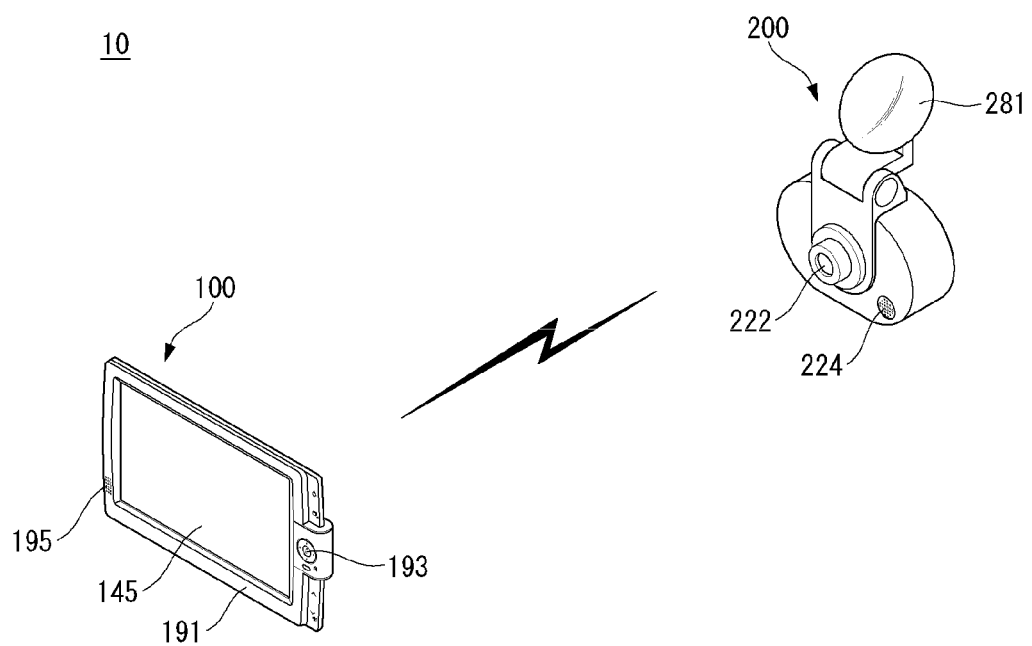
FIG. 2 illustrates a navigation system according to another embodiment of the present invention.

FIG. 2 illustrates a navigation system according to another embodiment of the present invention. Only parts different from the above-described embodiment will now be described.

The navigation system 10 according to another embodiment of the present invention may be wirelessly connected to the vehicle navigation system 100 and the vehicle block box 200. That is, the vehicle navigation system 100 and the vehicle black box 200 may be separate devices having no physical connecting device therebetween. The vehicle navigation system 100 and the vehicle black box 200 may communicate with each other through Bluetooth, RFID (Radio Frequency Identification), IrDA (Infrared Data Association), UWB (Ultra WideBand), ZigBee, etc.

Figure 3:
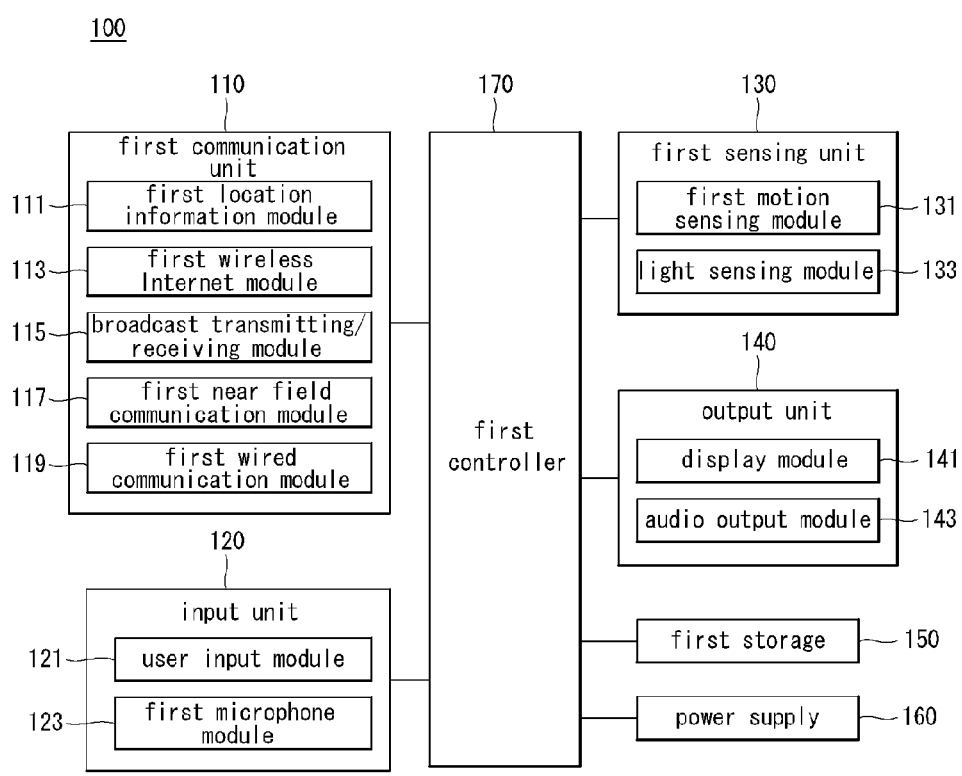
FIG. 3 is a block diagram of a vehicle navigation system shown in FIG. 1.

FIG. 3 is a block diagram of the vehicle navigation system 100 shown in FIG. 1.

Referring to FIG. 3, the vehicle navigation system 100 according to an embodiment of the present invention may include a first communication unit 110, an input unit 120, a first sensing unit 130, an output unit 140, a first storage 150, a power supply 160, and a first controller 170.

The first communication unit 100 is provided for the vehicle navigation system 100 to communicate with other devices. The first communication unit 100 may include a first location information module 111, a first wireless Internet module 113, a broadcast transmitting/receiving module 115, a first near field communication module 117, and a first wired communication module 119.

The first location information module 111 acquires location information through a GNSS (Global Navigation Satellite System). The GNSS is a navigation system that calculates the location of a receiver terminal using a radio signal received from an artificial satellite (20 shown in FIG. 5). Examples of the GNSS may include GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The first location information module of the vehicle navigation system 100 may obtain location information by receiving a GNSS signal provided in an area where the vehicle navigation system 100 is used.

The first wireless Internet module 113 acquires information or transmits information by accessing wireless Internet. The wireless Internet accessible by the wireless Internet module 113 may include WLAN (Wireless LAN), WiBro (Wireless Broadband), Wimax (World interoperability for microwave access), HSDPA (High speed Downlink Packet Access), etc.

The broadcast transmitting/receiving module 115 transmits/receives broadcast signals through broadcasting systems. The broadcasting systems may include DMBT (Digital Multimedia Broadcasting Terrestrial), DMSS (Digital Multimedia Broadcasting Satellite), MediaFLO (Media Forward Link Only), DVBH (Digital Video Broadcast Handheld), ISDBT (Integrated Services Digital Broadcast Terrestrial), etc. Broadcast signals transmitted/received through the broadcast transmitting/receiving module 115 may include traffic information, living information, images captured by the vehicle black box (200 shown in FIG. 1), etc.

The first near field communication module 117 is a device for near field communication. The first near field communication module 117 can perform communication through Bluetooth, RFID, IrDA, UWB, ZigBee, etc.

The first wired communication module 119 is an interface capable of connecting the vehicle navigation system 100 to other devices by wire. The first wired communication module 119 may be a USB module capable of performing communication through a USB port. The vehicle navigation system 100 according to embodiments of the present invention can communicate with other devices through the first near field communication module 117 or the first wired communication module 119. Furthermore, when the vehicle navigation system 100 communicates with a plurality of devices, the vehicle navigation system 100 may communicate with one of the devices through the first near field communication module 117 and communicate with the other through the first wired communication module 119.

The input unit 120 converts an external physical input applied to the vehicle navigation system 100 into an electric signal. The input unit 120 may include a user input module 121 and a first microphone module 123.

The user input module 121 is a key input unit through which a user can apply an input through a push operation. The user input module 121 may be implemented as the navigation operation key (193 shown in FIG. 1) provided to the exterior of the housing (191 shown in FIG. 1) of the vehicle navigation system 100.

The first microphone module 123 receives a user voice and a sound generated from the inside or outside of the vehicle. The first microphone module 123 may be implemented as the navigation microphone (195 shown in FIG. 1) provided to the exterior of the housing (191 shown in FIG. 1) of the vehicle navigation system 100.

The first sensing unit 130 senses a current state of the vehicle navigation system 100. The first sensing unit 130 may include a first motion sensing module 131 and a light sensing module 133.

The first motion sensing module 131 may sense a three-dimensional motion of the vehicle navigation system 100. The first motion sensing module 131 may include a 3-axis geomagnetic sensor and a 3-axis acceleration sensor. It is possible to calculate a more accurate trace of the vehicle equipped with the vehicle navigation system 100 by combining motion information acquired through the first motion sensing module 131 with location information obtained through the location information module 111.

The light sensing module 133 measures surrounding illuminance of the vehicle navigation system 100. It is possible to control the brightness of the display 145 to be varied with the surrounding illuminance using illuminance information acquired through the light sensing module 133.

The output unit 140 outputs information on the vehicle navigation system 100. The output unit 140 may include a display module 141 and an audio output module 143.

The display module 141 outputs visually recognizable information about the vehicle navigation system 100. The display module 141 may be implemented as the display (145 shown in FIG. 1) provided to the front of the housing (191 shown in FIG. 1) of the vehicle navigation system 100. If the display module 141 is a touchscreen, the display module 141 can function as both the output unit 140 and the input unit 120, as described above.

The audio output module 143 outputs auditorily recognizable information about the vehicle navigation system 100. The audio output module 143 may be implemented as a speaker outputting information that needs to be signaled to users including a driver as sound.

The first storage 150 stores information necessary for operation of the vehicle navigation system 100 and information generated according to the operation. The first storage 150 may be a memory built in the vehicle navigation system 100 or a detachable memory. The information necessary for the operation of the vehicle navigation system 100 may include an OS, route search application, map, etc. The information generated according to the operation of the vehicle navigation system 100 may include information about a searched route, a received image, etc.

The power supply 160 supplies power necessary for the operation of the vehicle navigation system 100 or operations of other devices connected to the vehicle navigation system 100. The power supply 160 may be a device provided with power from a battery set in the vehicle navigation system 100 or an external power supply. The power supply 160 may be implemented as the first wired communication module 119 or a device wirelessly provided with power, according to power supply form.

The first controller 170 outputs control signals for controlling operations of the vehicle navigation system 100. Furthermore, the first controller 170 may output control signals for controlling other devices connected to the vehicle navigation system 100.

Figure 4:
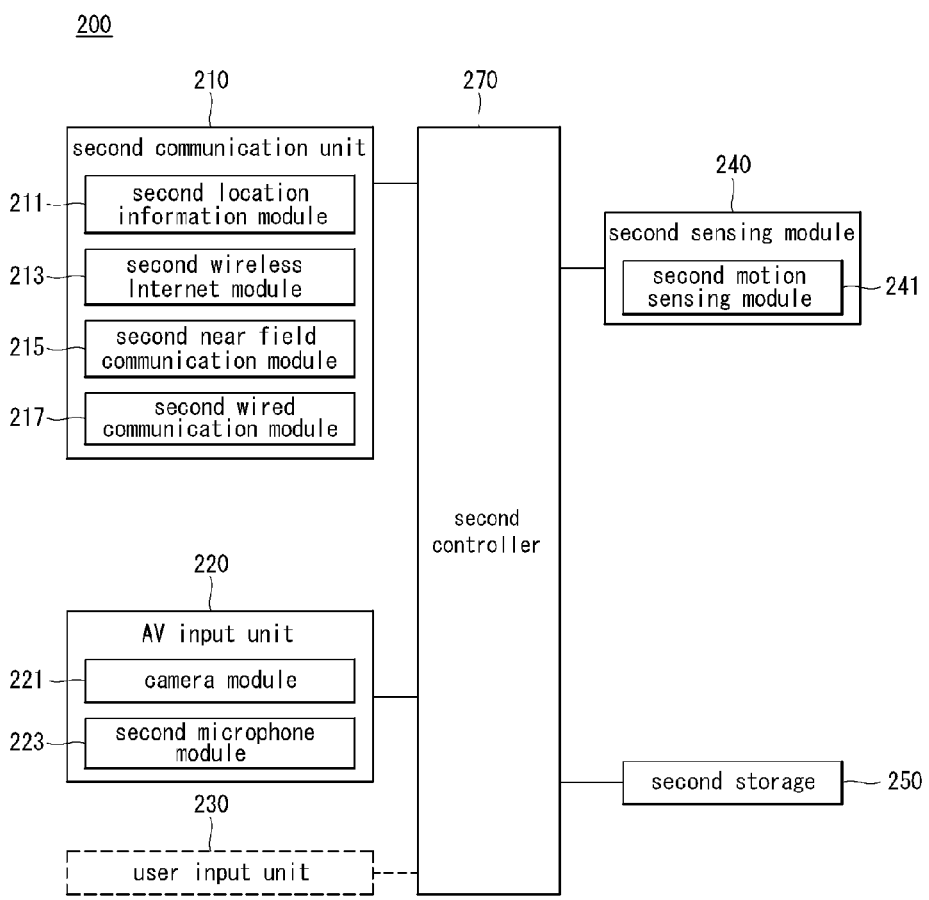
FIG. 4 is a block diagram of a vehicle block box shown in FIG. 1.

FIG. 4 is a block diagram of the vehicle black box 200 shown in FIG. 1.

Referring to FIG. 4, the vehicle black box 200 according to an embodiment of the present invention may include a second communication unit 210, an AV input unit 220, a user input unit 230, a second sensing unit 240, and a second storage 250.

The second communication unit 210 may communicate with the first communication unit 110 of the vehicle navigation system (100 shown in FIG. 3) or other devices. The second communication unit 210 may include a second location information module 211, a second near field communication module 213, and a second wired communication module 215. The second location information module 211 performs an operation similar to that of the first location information module (111 shown in FIG. 3). The second near field communication module 213 can communicate with the first near field communication module (117 shown in FIG. 3) and the second wired communication module 215 can communicate with the first wired communication module (119 shown in FIG. 3).

The AV input unit 220 may acquire sounds and images. The AV input unit 220 may include a camera module 221 and a second microphone module 223.

The camera module 221 may capture images of the inside and outside of the vehicle equipped with the vehicle black box 200. The camera module 221 may be implemented as the black box camera (222 shown in FIG. 1), as described above.

The second microphone module 223 may obtain sounds generated from the inside and outside of the vehicle. The sounds obtained through the second microphone module 223 may be used to control operation of the vehicle black box 200. For example, when a sound with higher intensity is received through the second microphone module 223, the camera module 221 can be controlled to capture an image with higher resolution. The second microphone module 223 may be implemented as the black box microphone 224.

The user input unit 230 is a device through which a user directly operates the vehicle black box 200. The user input unit 230 may be implemented as a push button (not shown) provided to the exterior of the vehicle black box 200. If the vehicle black box 200 is controlled by a control signal of the first controller (170 shown in FIG. 3) of the vehicle navigation system (100 shown in FIG. 3), the user input unit 230 may be excluded from the vehicle black box 200.

The second sensing unit 240 may sense a current state of the vehicle black box 200. The second sensing unit 240 may include a second motion sensing module 241 and performs an operation similar to that of the first motion sensing module (131 shown in FIG. 3). If the second sensing unit 240 is included in the vehicle black box 200, the second sensing unit 240 may not receive information about a three-dimensional motion from the vehicle navigation device 100.

The second storage 250 stores information necessary for operations of the vehicle black box 200 and information generated according to the operations of the vehicle black box 200. The information stored in the second storage 250 may be images captured by the camera module 221. The second storage 250 may be included in the vehicle black box 200 or may be a memory detachably set in the vehicle black box 200.

The second controller 270 outputs control signals for controlling operations of the vehicle black box 200. The second controller 270 may be affected by control signals of the first controller (170 shown in FIG. 3) of the vehicle navigation system (100 shown in FIG. 3). That is, the second controller 270 may be dependent on the first controller (170 shown in FIG. 3).

Figure 5:
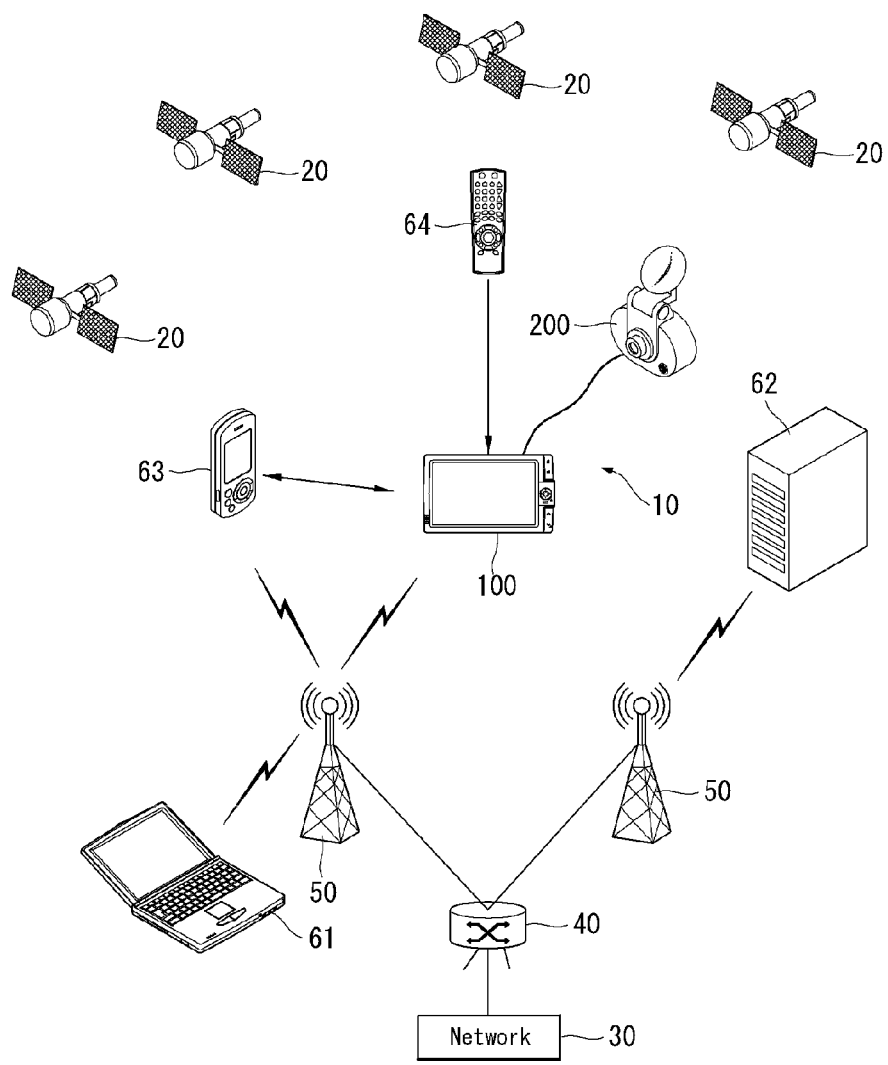
FIG. 5 illustrates a configuration of a communication network including the navigation system shown in FIG. 1.

FIG. 5 illustrates a configuration of a communication network including the navigation system 10 shown in FIG. 1.

Referring to FIG. 5, the navigation system 10 according to an embodiment of the present invention may be linked with various communication networks and other electronic devices 61 to 64.

The navigation system 10 may calculate a current location thereof using radio signals received from artificial satellites 20. The artificial satellites 20 may transmit L-band frequency signals having different frequency bands. The navigation system 10 can calculate the current location thereof on the basis of a time required for the L-band frequency transmitted from each artificial satellite 20 to arrive at the navigation system 10.

The navigation system 10 may wirelessly access a network 30 through a control station (ACR) 40 and a base station (RAS) 50 via the first communication unit (110 shown in FIG. 3). When the navigation system 10 is linked with the network 30, the navigation system 10 can exchange information with the electronic devices 61 and 62 linked to the network 30 by being indirectly with the electronic devices 61 and 62.

The navigation system 10 may indirectly access the network 30 through another device 63 having a communication function. For example, if the navigation system 10 does not include a device through which the navigation system 10 access the network 30, the navigation system 10 can communicate with the other device 63 having the communication function through the first near field communication module (117 shown in FIG. 3) or the like.

Operations of mapping video data with location data according to embodiments of the present invention will now be described with reference to FIGS. 6, 7 and 8.

Figure 6:
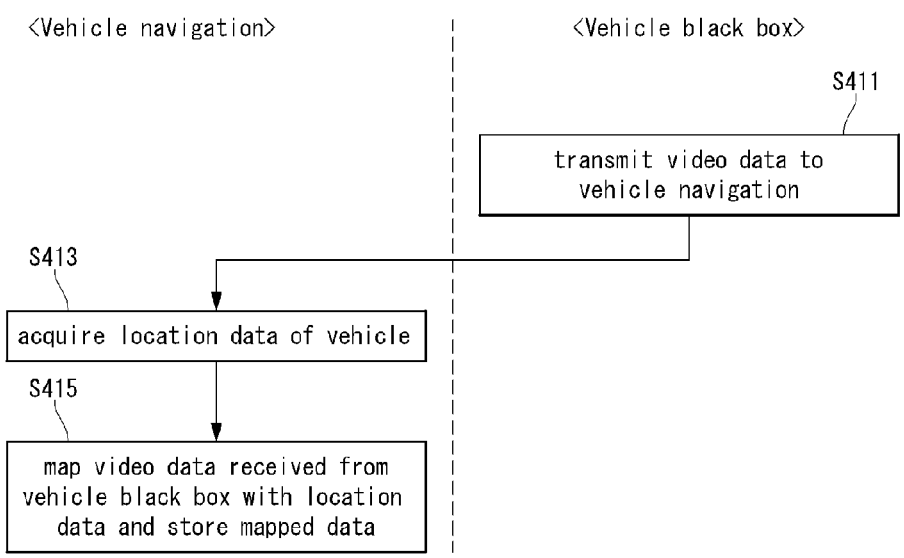
FIGS. 6 to 8 are flowcharts illustrating operations of mapping video data with location data according to embodiments of the present invention.
Figure 7:
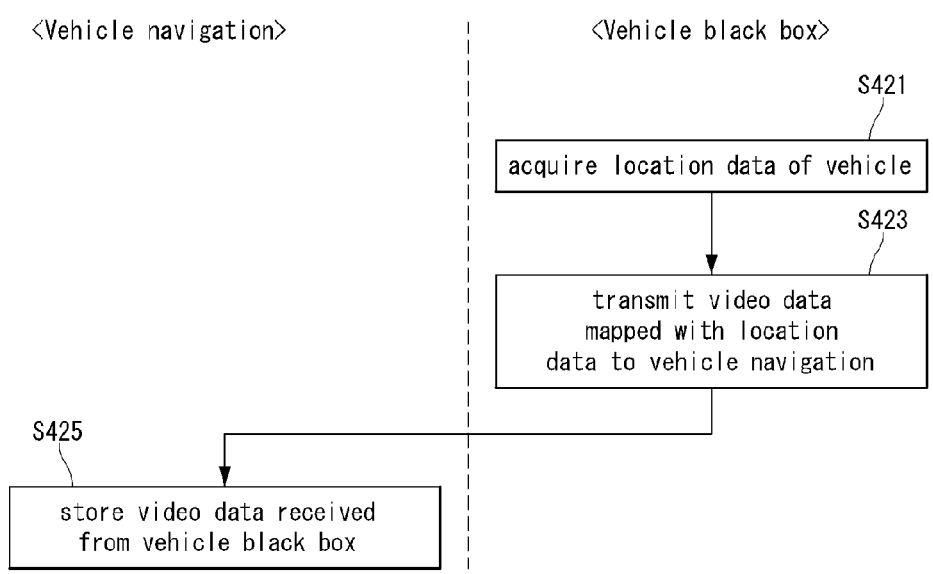
Figure 8:
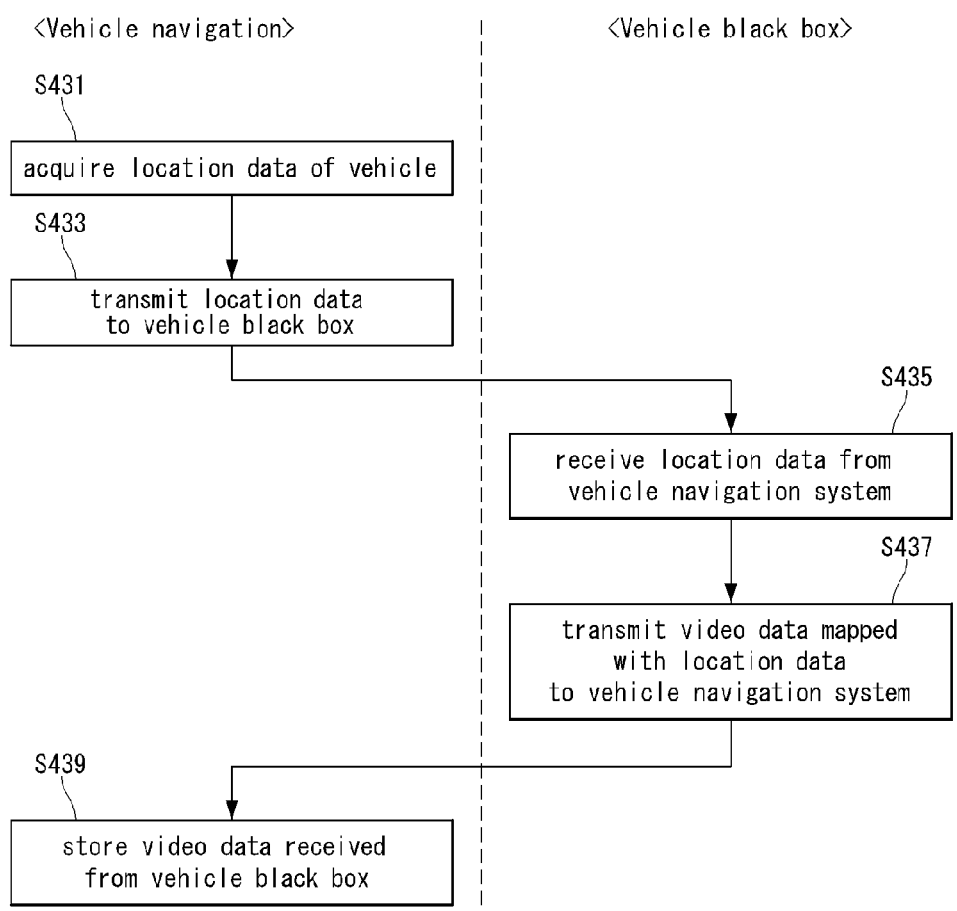

FIGS. 6, 7 and 8 are flowcharts illustrating the operations of mapping video data with location data according to embodiments of the present invention.

The vehicle navigation system (100 shown in FIG. 3) receives video data, acquired by photographing the inside and outside of a vehicle, from the vehicle black box (200 shown in FIG. 4) and stores the received video data in the first storage (150 shown in FIG. 3). The video data is mapped with location data including longitude data, latitude data, etc.

The video data may be acquired using the vehicle black box (200 shown in FIG. 4) for a predetermined period of time. For example, the video data has a predetermined play time, such as one minute or five minutes. Furthermore, the video data may have a predetermined size. For example, the video data has a size of 1 MB or 5 MB.

The vehicle black box (200 of FIG. 4) may transmit the video data acquired by photographing the inside and outside of the corresponding vehicle to the vehicle navigation system (100 shown in FIG. 3) periodically or at the request of the vehicle navigation system (100 shown in FIG. 3).

An operation of mapping video data with location data according to an embodiment of the present invention will now be described with reference to FIG. 6.

The second communication unit (210 of FIG. 4) of the vehicle black box (200 of FIG. 4) installed in a vehicle transmits video data, acquired by photographing the inside and outside of the vehicle, to the vehicle navigation system (100 of FIG. 3) (S411). The first communication unit (110 of FIG. 3) of the vehicle navigation system (100 of FIG. 3) obtains location data of the vehicle (S413) and the first controller (170 of FIG. 3) maps the video data received from the vehicle black box (200 of FIG. 4) with the location data and stores the mapped data in the first storage (150 of FIG. 3) (S415).

While step S413 follows step S411 in the present embodiment, the order of steps S411 and S413 is not limited thereto and step S413 may be performed prior to step S411 or steps S411 and S415 may be carried out simultaneously.

An operation of mapping video data with location data according to another embodiment of the present invention will now be described with reference to FIG. 7.

The second communication unit (210 of FIG. 4) of the vehicle black box (200 of FIG. 4) acquires location data of the vehicle (S421) and transmits video data mapped with the location data to the vehicle navigation system (100 of FIG. 3) (S423). The first communication unit (110 of FIG. 3) of the vehicle navigation system (100 of FIG. 3) receives the video data from the vehicle black box (200 of FIG. 4) and the first controller (170 of FIG. 3) stores the received video data in the first storage (150 of FIG. 3) (S425).

An operation of mapping video data with location data according to another embodiment of the present invention will now be described with reference to FIG. 8.

The first communication unit (110 of FIG. 3) of the vehicle navigation system (100 of FIG. 3) obtains location data of the vehicle (S431) and transmits the location data to the vehicle black box (200 of FIG. 4) (S433). The second communication unit (210 of FIG. 4) of the vehicle black box (200 of FIG. 4) receives the location data of the vehicle (S435) and transmits video data mapped with the location data to the vehicle navigation system (100 of FIG. 3) (S437). The first communication unit (110 of FIG. 3) of the vehicle navigation system (100 of FIG. 3) receives the video data from the vehicle black box (200 of FIG. 4) and the first controller (170 of FIG. 3) stores the received video data in the first storage (150 of FIG. 3) (S439).

The process of mapping video data with location data according to an embodiment of the present invention will now be described in more detail.

The first controller (170 of FIG. 3) of the vehicle navigation system (100 of FIG. 3) may store location data mapped with video data in the form of a separate file in the first storage 150. That is, the first controller (170 of FIG. 3) can store the location data in a folder in which the video data is stored, in the same file name as that of the video data. Here, the location data may include time information and may be synchronized with the video data using the time information. For example, if a total play time of the video data is 10 minutes, and the video data is mapped to location A before 5 minutes and mapped to location B after 5 minutes, the location data includes information about "location A" and information about "location B", which respectively correspond to time information of "0 to 5 minutes" and "5 to 10 minutes".

The first controller (170 of FIG. 3) of the vehicle navigation system (100 of FIG. 3) can map the location data to video frames of a predetermined video frame type from among video frames corresponding to the video data. Video frame types include I (Intra) frame, P (Predicted) frame and B (Bidirectional) frame. For example, the location data is mapped to I frame from among the video frames of the video data.

The first controller (170 of FIG. 3) of the vehicle navigation system (100 of FIG. 3) may map the location data with the video data at predetermined intervals. For example, the first controller (170 of FIG. 3) of the vehicle navigation system (100 of FIG. 3) can map the location data with the video data at an interval of one minute or 5 minutes.

While the vehicle navigation system (100 of FIG. 3) maps video data with location data in the above description, the vehicle black box (200 of FIG. 4) can map video data with location data in the same manner.

An operation of storing video data according to an embodiment of the present invention will now be described in more detail.

The first controller (170 of FIG. 3) of the vehicle navigation system (100 of FIG. 3) can classify video data according to video data type and store classified the video data. That is, the first controller (170 of FIG. 3) of the vehicle navigation system (100 of FIG. 3) can classify folders according to video data type and store video data in a corresponding folder, or store video data in a file name including the video data type corresponding to the video data. Video data types include video data (referred to as "first video data type" hereinafter) obtained from a signal of a sensor set in the vehicle, video data (referred to as "second video data type" hereinafter) obtained according to an operation of a user, and video data (referred to as "third video data type" hereinafter) obtained according to an operation of the vehicle black box (200 of FIG. 4). That is, the first video data type ("E" shown in FIG. 13) corresponds to video data obtained by photographing the inside or outside of the vehicle according to a signal of a sensor which senses external impact applied to the vehicle, speeding, rapid acceleration, rapid reduction, etc. of the vehicle, or external noise. The second video data type ("M" shown in FIG. 13) corresponds to video data obtained by photographing the inside and/or outside of the vehicle at the request of the user. The third video data type ("A" shown in FIG. 13) corresponds to video data obtained by photographing the inside and/or outside of the vehicle when the vehicle black box (200 of FIG. 4) normally operates.

The first controller (170 of FIG. 3) of the vehicle navigation system (100 of FIG. 3) can classify video data according to location data and store the classified video data. That is, the first controller (170 of FIG. 3) of the vehicle navigation system (100 of FIG. 3) can classify folders according to location data and store video data in a corresponding folder.

While the vehicle navigation system (100 of FIG. 3) stores video data in the above description, the vehicle black box (200 of FIG. 4) can store video data in the same manner.

An operation of searching video data according to an embodiment of the present invention will now be described with reference to FIGS. 9 to 12.

Figure 9:
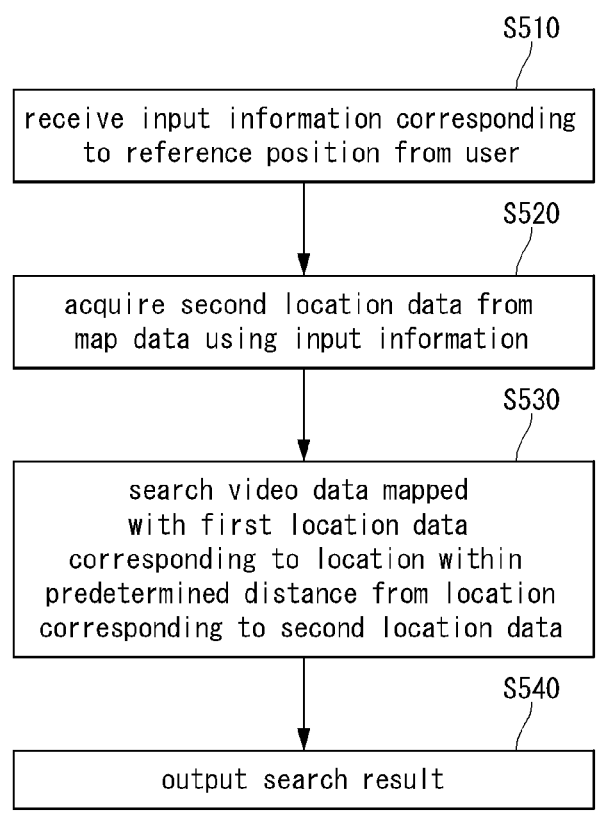
FIG. 9 is a flowchart illustrating a procedure of searching video data according to an embodiment of the present invention.
Figure 10:
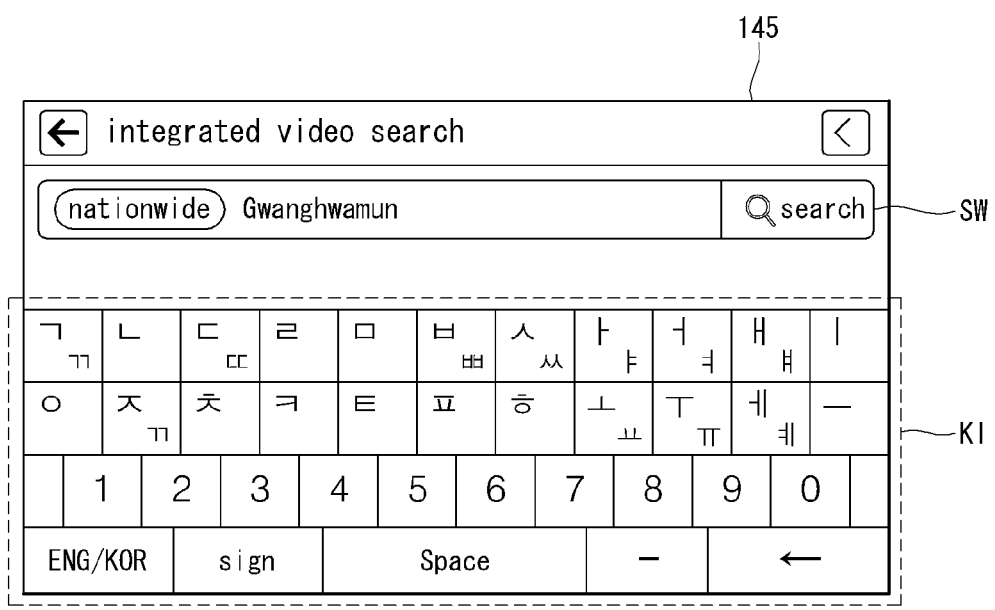
FIG. 10 shows an example of inputting input information according to an embodiment of the present invention.
Figure 11:
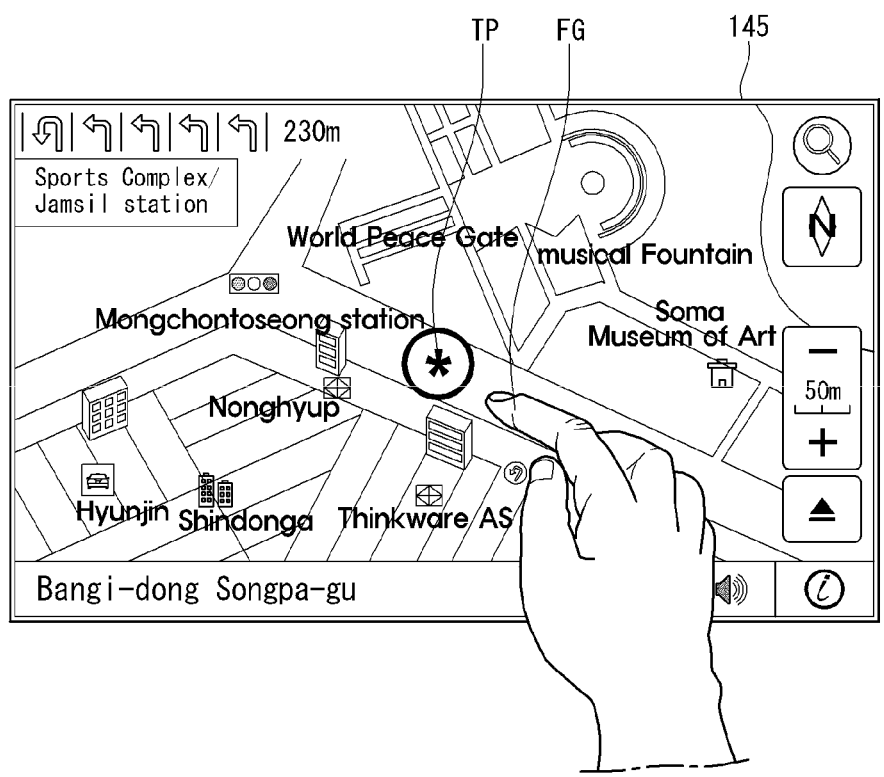
FIG. 11 shows an example of inputting input information according to another embodiment of the present invention.
Figure 12:
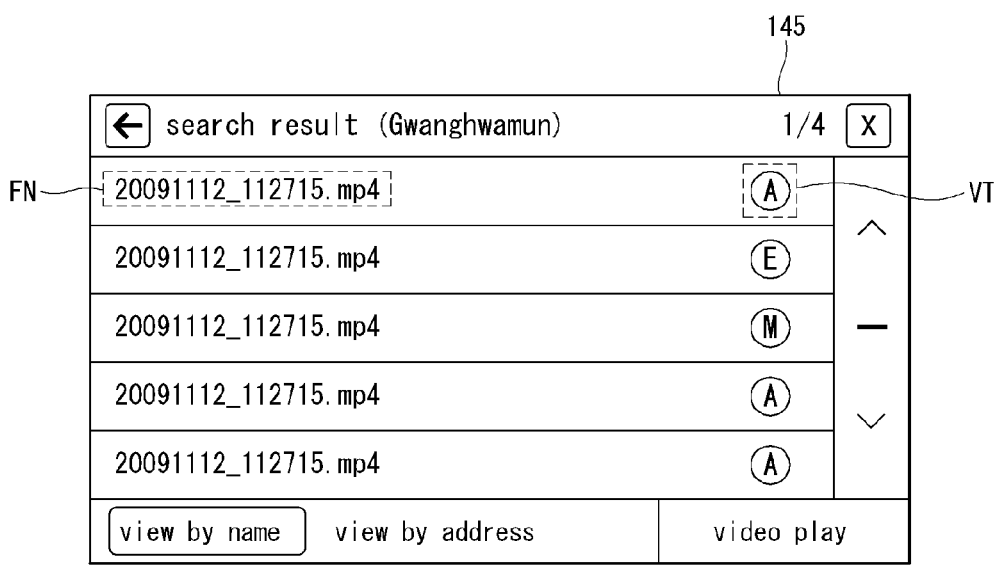
FIG. 12 shows an example of a search result according to an embodiment of the present invention.

FIG. 9 is a flowchart illustrating a procedure of searching video data according to an embodiment of the present invention, FIG. 10 shows an example of inputting input information according to an embodiment of the present invention, FIG. 11 shows an example of inputting input information according to another embodiment of the present invention, and FIG. 12 shows an example of a search result according to an embodiment of the present invention.

A user inputs information corresponding to a reference position through the input unit (120 of FIG. 3) of the vehicle navigation system (100 of FIG. 3) (S510). Specifically, as shown in FIG. 10, the user inputs location information, which corresponds to a reference position used for a search operation, to a search word input part (SW) through a keyboard KI. The location information includes address information, place name information, company/shop name information, POI (Point of Interest) information, etc. The address information is an identification code used to identify a place, given by a governmental institution, a public institution or the like. The address information may be a full address such as "31, Taepyeongno 1-ga, Junggu, Seoul" or part of an address, such as "Taepyeongno 1-ga, Jung-gu, Seoul" or "Yeoksam-dong". The place name information identifies a village such as "Seo-rae village", district, mountain, river, region, etc. The company/shop name information is used for merchants to advertise their businesses, "Lotteria", "Starbucks", etc. The POI information corresponds to a widely known place such as "Gwanghwamun Square", "City hall square" or the like, a subway station name such as "Gangnamyeok", "Sadan-gyeok" or the like, or a governmental institution or a public institution such as "Seoul City Hall", "Jongno-gu office" or the like. The user can designate a specific place such as "home" or "office" as the POI information. If the location information input by the user corresponds to a plurality of places, the first controller (170 of FIG. 3) of the vehicle navigation system (100 of FIG. 3) may display a list of the plurality of places on the display (145 of FIG. 1) such that the user can select a desired place.

Referring to FIG. 11, the user can input touch point information used as a reference position during a search operation by touching a reference point TP on a map displayed on the display (145 of FIG. 1) using a finger FG. Alternatively, the user can input pointing position information used as a reference position during a search operation by pointing the reference point TP using a direction key provided to the vehicle navigation system (100 of FIG. 3) or a remote controller connected to the vehicle navigation system (100 of FIG. 3).

The first controller (170 of FIG. 3) of the vehicle navigation system (100 of FIG. 3) obtains second location data from map data using the information input by the user (S520). The map data contains place data and location data corresponding to the place data in addition to map information. Accordingly, it is possible to acquire location data corresponding to place data input by the user. The map data also contains location data about each point on the map. Accordingly, it is possible to obtain location data corresponding to touch point information or pointing position information input by the user.

The first controller (170 of FIG. 3) of the vehicle navigation system (100 of FIG. 3) searches the first storage (150 of FIG. 3) for video data mapped with first location data corresponding to a location within a predetermine distance from the location corresponding to the second location data (S530). For example, the first controller (170 of FIG. 3) searches video data mapped with the first location data corresponding to a location within a distance of 500 m or 1 Km from the location corresponding to the second location data. Specifically, the first controller (170 of FIG. 3) calculates a distance between the location corresponding to the first location data mapped with the video data and the location corresponding to the second location data and adds the video data to the search result when the calculated distance is less than the predetermined distance. The first controller (170 of FIG. 3) of the vehicle navigation system (100 of FIG. 3) may search the video data on the basis of a distance directly input by the user. When the video data is stored in the vehicle black box (200 of FIG. 4), the first controller (170 of FIG. 3) of the vehicle navigation system (100 of FIG. 3) may request the vehicle black box (200 of FIG. 4) to search the video data and receive the search result from the vehicle black box (200 of FIG. 4).

If the video data is being reproduced, the first controller (170 of FIG. 3) of the vehicle navigation system (100 of FIG. 3) searches video frames corresponding to the reproduced video data for a video frame (partial image) mapped with the first location data corresponding to the location within the predetermined distance from the location corresponding to the second location data.

Then the first controller (170 of FIG. 3) of the vehicle navigation system (100 of FIG. 3) displays the search result on the display (145 of FIG. 1) (S540). Referring to FIG. 12, a search result screen displays a list of video data mapped with location data corresponding to locations within the predetermined distance from the reference point input by the user. Each item of the video data is composed of a file name FN and a video data type VT. The video data type VT represents the type of the corresponding video data. Accordingly, the user can recognize whether the corresponding video data has been obtained according to a signal of a sensor set in the vehicle, or obtained at the request of the user, or acquired when the vehicle black box (200 of FIG. 4) operates. When the user selects video data, the first controller (170 of FIG. 3) of the vehicle navigation system (100 of FIG. 3) displays the selected video data on the display (145 of FIG. 1). Here, the video data may be displayed in the form of PIP (Picture In Picture), NIP (Navigation In Picture), etc.

When the video frame have been searched while the video data is reproduced, the first controller (170 of FIG. 3) of the vehicle navigation system (100 of FIG. 3) can display a video frame list instead of the video data list on the search result screen. In this case, the file name FN can be replaced by time information of the video frame.

Input screens shown in FIGS. 10 and 11 and the search result screen shown in FIG. 12 are exemplary and they can be configured in other forms.

As described above, it is possible to search video data or a video frame even when the user does not input information on a correct location by searching video data mapped with the first location data corresponding to a location within the predetermined distance from the location corresponding to the second location data obtained using the information input by the user.

A server connected to the navigation system according to an embodiment of the present invention will now be described with reference to FIGS. 13 and 14.

Figure 13:
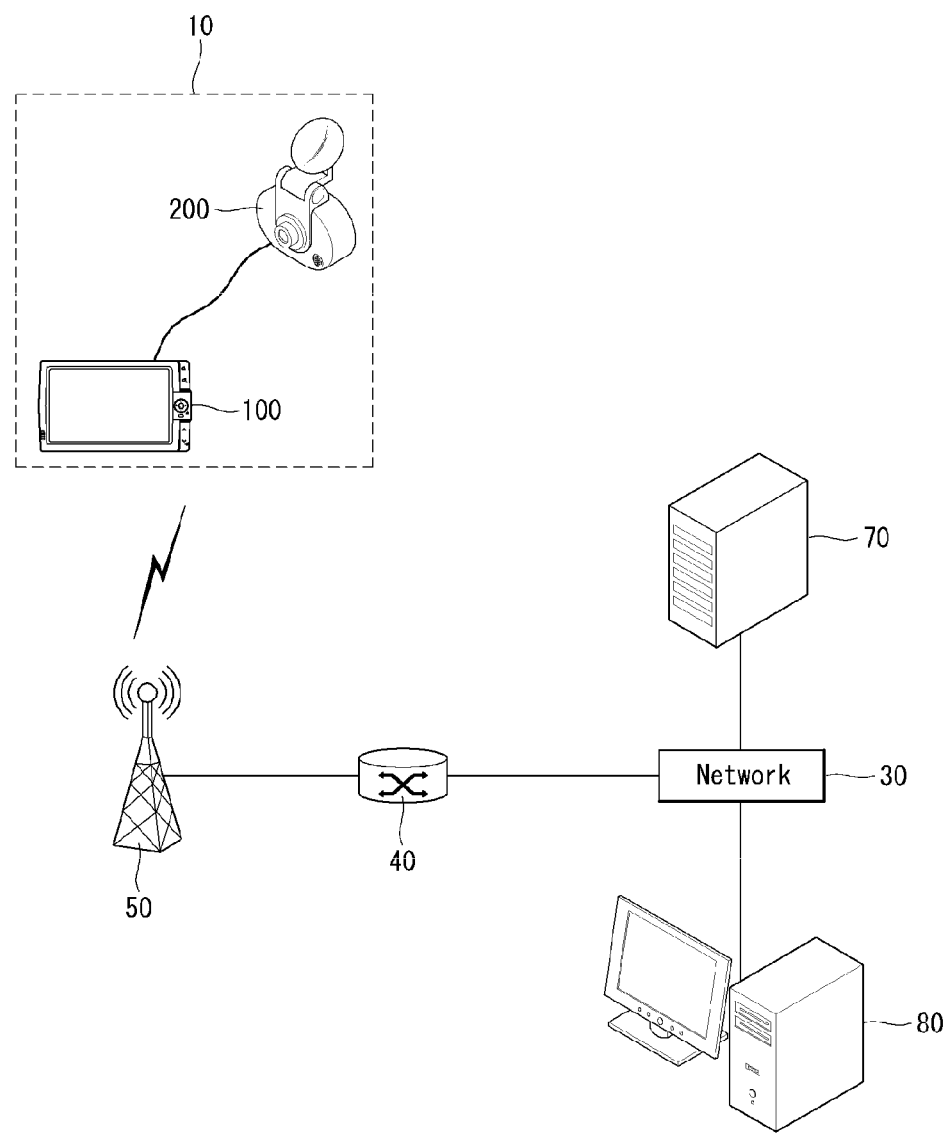
FIG. 13 illustrates a server connected to the navigation system according to an embodiment of the present invention.
Figure 14:
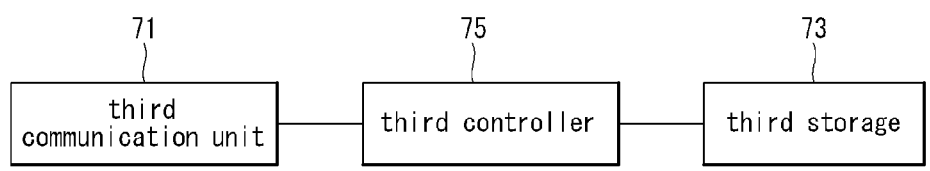
FIG. 14 is a block diagram of the server shown in FIG. 13.

FIG. 13 illustrates a server 70 connected to the navigation system according to an embodiment of the present invention and FIG. 14 is a block diagram of the server shown in FIG. 13.

The server 70 may be connected to the navigation system 10 and a user terminal 80 via the network 30.

The server 70 may include a third communication unit 71, a third storage 73, and a third controller 75, store video data received from the navigation system 10 and transmit data, information, etc. to the user terminal 80 at the request of the user terminal 80.

The third storage 73 stores information necessary for operations of the server 70 and information generated according to the operations. The third storage 73 may be a memory built in the server 70 or a detachable memory. The third storage 73 may be an independent storage device connected to the server 70 via the network 30. The information necessary for operations of the server 70 includes OS, map data, etc. As described above, the map data contains place data and location data corresponding to the place data as well as map information. In addition, the map data includes data regarding locations on the map. The information generated according to operations of the server 70 may be route guide information, information on accident black spots, etc.

The third communication unit 71 receives video data mapped with the first location data from the navigation system 10 through the network 30. Here, the vehicle navigation system (100 of FIG. 1) or the vehicle black box (200 of FIG. 1) can transmit the video data to the server 70, or the vehicle black box (200 of FIG. 1) can transmit the video data to the server 70 through the vehicle navigation system (100 of FIG. 1). Furthermore, the navigation system 10 may transmit identification information for identifying the navigation system 10 along with the video data to the server 70. The third communication unit 71 transmits/receives various types of data, information, etc. to/from the user terminal 80 via the network 30.

The third controller 75 stores the video data, received from the navigation system 10 through the third communication unit 71, in the third storage 73. In this case, the third controller 75 can classify the video data according to video data type, location data, navigation system identification information, etc. and store the classified video data.

The third controller 75 obtains the second location data from map data stored in the third storage 73 using input information received from the user terminal 80 through the third communication unit 71. As described above, the input information corresponds to place information, touch point information, pointing position information, etc. The user may input place information through a search word input screen displayed on the user terminal 80, input touch point information used as a reference position during a search operation by touching a map displayed on the user terminal 80 with a finger, or input pointing position information used as a reference position during a search operation by pointing a location through a keyboard (not shown) or a mouse (not shown) connected to the user terminal 80. The map data contains data regarding locations on the map, and thus location data corresponding to the touch point information or pointing position information can be obtained from the map data.

The third controller 75 searches the third storage 73 for the video data mapped with the first location data corresponding to a location within a predetermined distance from the location corresponding to the second location data. As described above, the third controller 75 searches the video data mapped with the first location data corresponding to a location within a predetermined distance such as 500 m or 1 Km from the location corresponding to the second location data. The third controller 75 may search the video data on the basis of distance information received from the user terminal 80. The distance information is input by the user. The third controller 75 transmits the search result to the user terminal 80 through the third communication unit 71.

If the video data is being reproduced, the third controller 75 searches video frames corresponding to the reproduced video data for a video frame (partial image) mapped with the first location data corresponding to a location within the predetermined distance from the location corresponding to the second location data.

The third controller 75 obtains route information about a route to a predetermined location using video data stored in the third storage 73. Route information corresponds to an image of a route from a starting point to a specific destination. For example, location data corresponding to a plurality of locations included in a route from a starting place to a destination is obtained and video data mapped with the obtained location data is searched. Then, route information about the route from the starting place to the destination can be obtained using the searched video data. In this case, the predetermined location can be acquired using destination information received from the user terminal 80 through the third communication unit 71. The destination information means a destination of a route that the user wants to check. It is possible to receive information on a starting place from the user terminal 80 along with the destination information. The third controller 75 transmits the route information to the user terminal 80 at the request of the user terminal 80.

The third controller 75 obtains information on accident black spots using the video data stored in the third storage 73. The information on accident black spots corresponds to images of accident black spots. For example, location data corresponding to accident black spots provided by a governmental institution such as the national police agency, a public institution, a private organization, etc. is obtained and video data mapped with the obtained location data is searched. It is possible to acquire images of accident black spots using the searched video data. The third controller 75 transits the information on accident black spots to the user terminal 80 through the third communication unit 71 at the request of the user terminal 80.

As described above, the route information, information about accident black spots, etc., obtained using the video data mapped with the first location data, are provided to the user such that the user can use a variety of new services.

The user terminal 80 is a communication terminal device used by the user to use various services provided by the server 70 and transmits/receives data, information, etc. by being connected to the server 70 through the network 30. The user can use various services by accessing the server 70 using a web browser such as Internet explorer or an application program installed in the user terminal 80. The user terminal 80 may be a terminal including a memory and having a computational capability using a microprocessor installed therein, such as a desktop computer, a laptop computer, a workstation, a palmtop computer, an ultra mobile personal computer (UMPC), a tablet PC, a personal digital assistant (PDA), a web pad, a cellular phone or the like.

An operation of searching video data according to another embodiment of the present invention will now be described with reference to FIG. 15.

Figure 15:
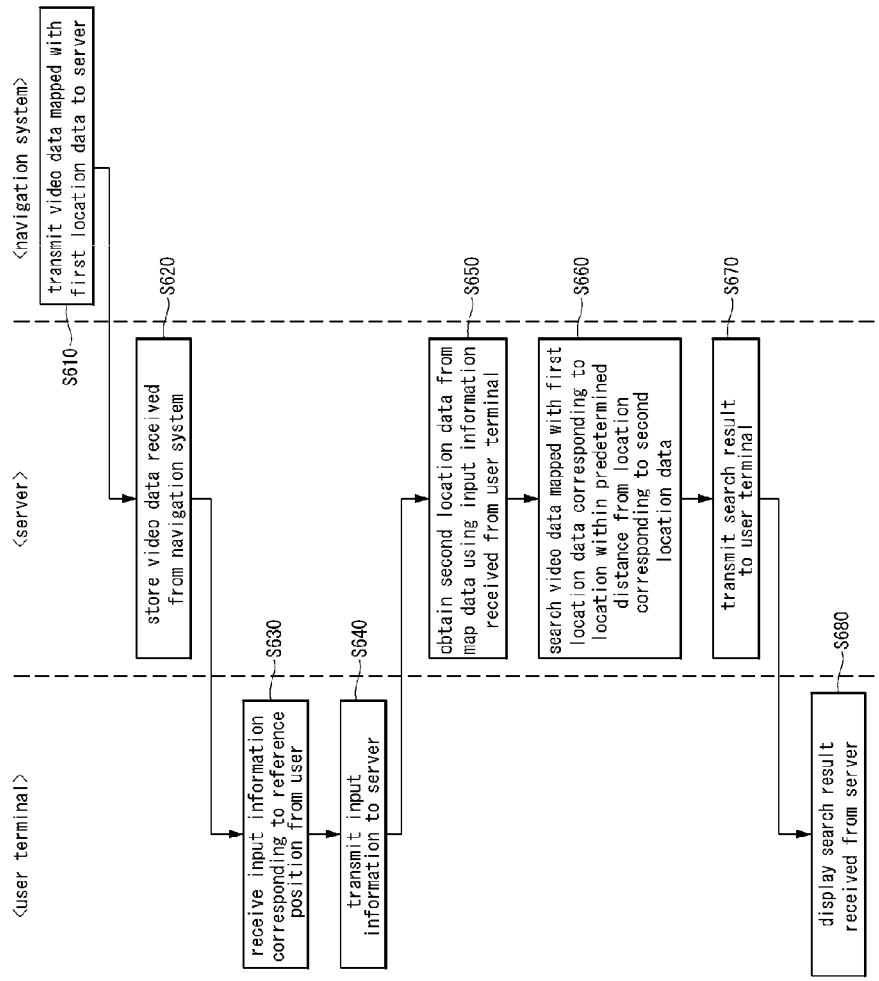
FIG. 15 is a flowchart illustrating a procedure of searching video data according to another embodiment of the present invention.

FIG. 15 is a flowchart illustrating a procedure of searching video data according to another embodiment of the present invention.

The navigation system (10 of FIG. 13) transmits video data mapped with the first location data to the server (70 of FIG. 13) through the network (30 of FIG. 13) (S610). Then, the server (70 of FIG. 13) stores the video data received from the navigation system (10 of FIG. 13) (S620).

The user terminal (80 of FIG. 13) receives input information corresponding to a reference position from the user (S630). As described above, the input information includes place information, touch point information, pointing position information, etc. The user terminal (80 of FIG. 13) transmits the input information input by the user to the server (70 of FIG. 13) via the network (30 of FIG. 13) (S640).

The server (70 of FIG. 13) acquires the second location data from map data using the input information received from the user terminal (80 of FIG. 13) (S650). The server (70 of FIG. 13) searches video data mapped with the first location data corresponding to a location within a predetermined distance from the location corresponding to the second location data (S660). As described above, the server (70 of FIG. 13) searches the video data mapped with the first location data corresponding to a location within a predetermined distance such as 500 m or 1 Km from the location corresponding to the second location data. The server (70 of FIG. 13) may search video data on the basis of distance information received from the user terminal (80 of FIG. 13).

If the video data is being reproduced, the server (70 of FIG. 13) searches video frames corresponding to the reproduced video data for a video frame (partial image) mapped with the first location data corresponding to a location within the predetermined distance from the location corresponding to the second location data.

Then, the server (70 of FIG. 13) transmits the search result to the user terminal (80 of FIG. 13) via the network (30 of FIG. 13) (S670). The user terminal (80 of FIG. 13) displays the search result received from the server (70 of FIG. 13) (S680).

While steps S610 and S620 are performed first in the above description, the order of steps of the above-mentioned procedure is not limited thereto and steps S610 and S620 can be performed prior to step S660.

As described above, it is possible to search video data or video frames even when the user does not input information on a correct location by searching video data mapped with first location data corresponding to a location within a predetermined distance from a location corresponding to second location data obtained using information input by the user.

The embodiments of the present invention may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The navigation system, server connected thereto, and a method for controlling vehicle navigation according to the present invention provides route information, information on accident black spots, etc., obtained using video data mapped with location data, to a user such that the user can use a variety of new services.

What is claimed is:

1. A vehicle navigation system comprising: a display;
an input unit configured to receive input information corresponding to a reference position;
a storage configured to store video data mapped with first location data, and map data;
a communication unit configured to receive the video data from a vehicle black box installed in a vehicle; and
a controller configured to obtain second location data from the map data using the input information, to search the storage for video data mapped with the first location data corresponding to a location within a predetermined distance from a location corresponding to the second location data and to output the search result to the display.

2. The vehicle navigation system of claim 1, wherein the input information includes at least one of address information, place name information, company/shop name information and POI (Point of Interest) information.

3. The vehicle navigation system of claim 1, wherein the input information corresponds to touch point information corresponding to a point touched by a user.

4. The vehicle navigation system of claim 1, wherein the input information corresponds to pointing position information corresponding to a position pointed by a user.

5. The vehicle navigation system of claim 1, wherein the video data is composed of a plurality of video frames mapped with the first location data,
wherein the controller is configured to search a video frame mapped with the first location data corresponding to a location within the predetermined distance from the location corresponding to the second location data.

6. The vehicle navigation system of claim 1, wherein the location data is obtained using a GNSS signal received from a satellite.

7. A server comprising:
a storage configured to store video data mapped with first location data, and map data;
a communication unit configured to receive the video data from a vehicle black box installed in a vehicle and to receive input information corresponding to a reference position from a user terminal; and
a controller configured to obtain second location data from the map data using the input information, to search the storage for video data mapped with the first location data corresponding to a location within a predetermined distance from a location corresponding to the second location data and to transmit the search result to the user terminal through the communication unit.

8. The server of claim 7, wherein the input information includes at least one of address information, place name information, company/shop name information and POI (Point of Interest) information.

9. The server of claim 7, wherein the input information corresponds to touch point information corresponding to a point touched by a user.

10. The server of claim 7, wherein the input information corresponds to pointing position information corresponding to a position pointed by a user.

11. The server of claim 7, wherein the video data is composed of a plurality of video frames mapped with the first location data,
wherein the controller is configured to search a video frame mapped with the first location data corresponding to a location within the predetermined distance from the location corresponding to the second location data.

12. The server of claim 7, wherein the location data is obtained using a GNSS signal received from a satellite.

13. The server of claim 7, wherein the controller is configured to obtain information on a route to a predetermined location using the video data and to transmit the route information to the user terminal through the communication unit.

14. The server of claim 13, wherein the communication unit is configured to receive destination information from the user terminal, wherein the predetermined location is obtained using the destination information.

15. The server of claim 7, wherein the controller is configured to obtain information on accident black spots using the video data and to transmit the information on accident black spots to the user terminal through the communication unit.

16. A method implemented in a vehicle navigation system comprising an input unit, a storage, a communication unit and a controller, for controlling vehicle navigation operation, the method comprising:
 receiving video data mapped with first location data from a vehicle black box installed in a vehicle into the communication unit;
 storing the video data in the storage;
 receiving input information corresponding to a reference position into the input unit;
 obtaining second location data from map data in the controller using the input information;
 searching video data mapped with the first location data corresponding to a location within a predetermined distance from a location corresponding to the second location data; and
 outputting the search result.

17. The method of claim 16, wherein the input information includes at least one of address information, place name information, company/shop name information and POI (Point of Interest) information.

18. The method of claim 16, wherein the input information corresponds to touch point information corresponding to a point touched by a user.

19. The method of claim 16, wherein the input information corresponds to pointing position information corresponding to a position pointed by a user.

* * * * *